United States Patent [19]
Wisniewski

[11] 3,735,173
[45] May 22, 1973

[54] ELECTRIC MOTOR CONSTRUCTION

[75] Inventor: Jules Wisniewski, Cliffside Park, N.J.

[73] Assignee: Simmonds Precision Products, Inc., Tarrytown, N.Y.

[22] Filed: Nov. 24, 1971

[21] Appl. No.: 201,639

[52] U.S. Cl..............................310/242, 310/246
[51] Int. Cl..............................................H02k 13/00
[58] Field of Search....................310/43, 46, 85, 89, 310/91, 239, 241, 242, 246, 154, 247

[56] References Cited

UNITED STATES PATENTS

| | | | |
|---|---|---|---|
| 3,525,891 | 8/1970 | Lukawich | 310/239 |
| 2,286,993 | 6/1942 | Naul | 310/43 |
| 2,775,717 | 12/1956 | Laing | 310/246 |
| 3,173,044 | 3/1965 | Pittman | 310/43 |
| 2,107,899 | 2/1938 | Mueller | 310/241 |
| 2,105,926 | 1/1938 | Mueller | 310/241 |
| 3,365,597 | 1/1968 | Hanyu | 310/43 |
| 3,463,951 | 8/1969 | Bauerle | 310/89 |

Primary Examiner—R. Skudy
Attorney—Edwin E. Greigg

[57] ABSTRACT

This invention relates to brush actuating mechanisms for direct current motors and, more particularly, to an innnovative plastic-molded housing for these motors. The invention discloses a plastic-molded housing, closed at one end and apertured at the other end, said closed end having opposed longitudinal recesses for receiving a brush, a cam lever, and a helical spring, respectively therein, positively retained by an end cover slipped over said closed end and secured thereto, while said apertured end provides for the insertion of permanent magnets and a driven shaft carrying an armature, and commutator.

9 Claims, 3 Drawing Figures

Patented May 22, 1973  3,735,173
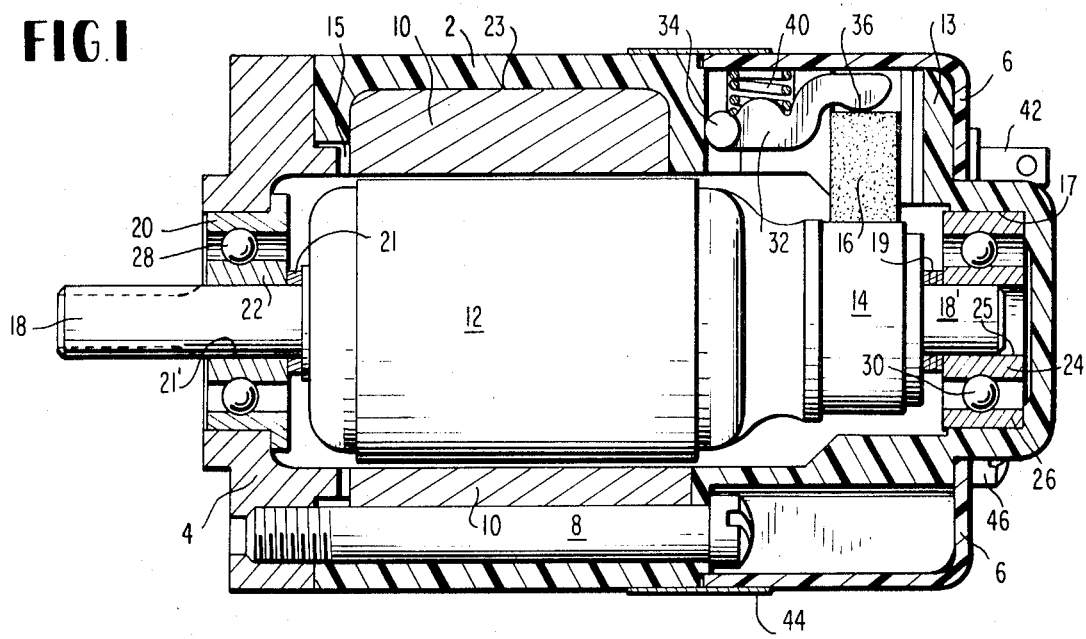
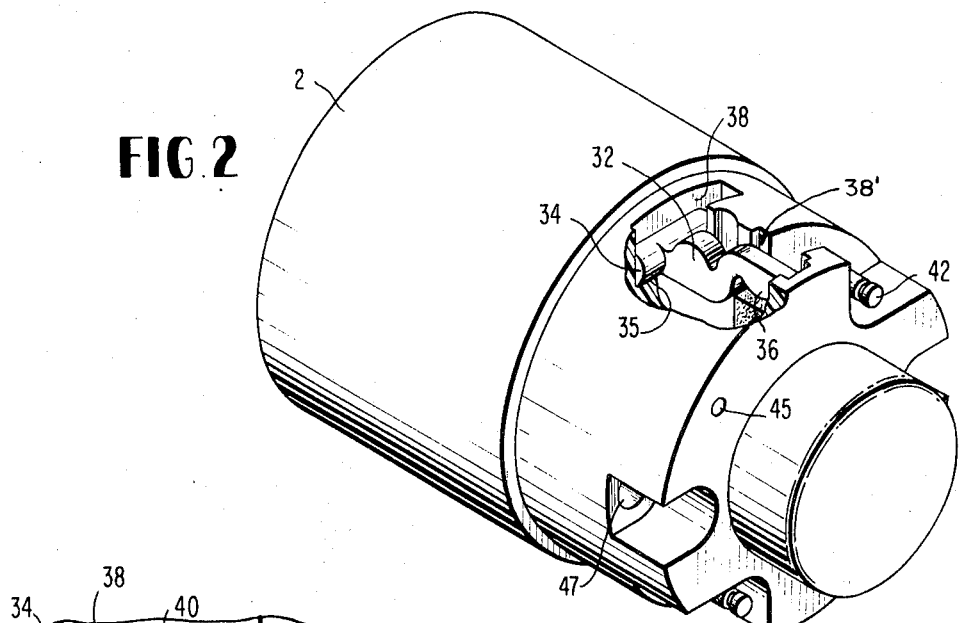

ELECTRIC MOTOR CONSTRUCTION

This invention relates to brush actuating mechanisms for direct current motors and, more particularly, to a plastic molded housing for direct current motors.

Generally, electric motors are comprised of a multiplicity of parts which require the time of a skilled craftsman for their assembly and maintenance. These electric motors are further characterized in that they are not particularly reliable. Known motor structures of this general type are short lived primarily because of bearing failure which is most frequently caused by carbon dust contamination due to a wearing away of the brushes against the armature.

It is an object of this invention to provide a plastic molded housing which will allow for the elimination of many parts which normally have only a secondary function in existing design motors.

It is a further object of the invention to provide an ease of assembly and maintenance of the motor by one other than a skilled craftsman.

It is a still further object of the invention to provide a novel brush assembly which will function with an efficiency equal to that of existing designs, however, with a much greater length of life by minimizing the wear of the brushes and therefore generally increasing the reliability of the product.

The invention accordingly comprises features of construction, combinations of elements, the arrangements of parts which will be exemplified in the construction hereinafter set forth, and in the scope of the application which will be indicated in the claims.

The invention will be better understood, as well as further objects and advantages of the invention will become more apparent from the ensuing detailed specification of a preferred, although exemplary, embodiment taken in conjunction with the drawing wherein:

FIG. 1 is a horizontal cross sectional view of an electric motor showing some of the elements in elevation;

FIG. 2 is an isometric view of a plastic molded housing clearly showing the critical cooperative elements according to the invention; and FIG. 3 is a top plan view of the brush actuating mechanism according to the invention.

Referring now to the drawings, FIG. 1 shows a plastic housing 2 constructed in a known manner, such as by blow molding incorporating molded-in permanent magnets 10—10 as shown, said housing having a closed end 13 and an oppositely disposed open end 15, the open end of the housing being designed to be enclosed by an end plate 4 to be further described below. With the electric motor design revealed in this application, it will be seen that the assembly of substantially all of its elements is achieved by being inserted through the open end 15.

The bearing comprising races 24, 26 and carrying balls 30 is inserted into the cavity 17 in the closed end of the housing, as shown. An armature 12 provided with a commutator 14 of a conventional type and including oppositely extending shafts 18, 18' is inserted through the open end of the housing, the end 18' of said shaft being mounted in a journal aperture 25 in said race 24 with the end of the shaft further carrying spacer means 19 designed to prevent longitudinal movement of the shaft assembly. A second bearing means having an outer race 20 and an inner race 22 is provided with balls 28 and with the journal aperture 21' designed to support the other end 18 of said shaft passing through said race. The armature assembly is further designed to be retained from longitudinal movement by a spacer means 21 positioned on the shaft between the armature and the inner end wall of the race 22, said race assembly being retained in an aperture in the end plate 4 which encloses the open end of said housing subsequent to assembly of the elements of said electric motor therewithin. The end plate 4 is fixed to said housing via two screws 8 (one shown), these being arranged to pass through the housing into said end plate and secured therein prior to assembly of the cover 6 which will be referred to later herein.

With the exception of the novel plastic molded housing, the description up to this point has been with regard to a substantially conventional electric motor. The novelty of the instant invention will become obvious, however, in the succeeding description of the final assembly of an electric motor according to the invention.

The brush pigtails, not shown, are crimped or soldered to each of the terminals 42, at which time the brushes 16 are inserted into one of a pair of guide means 38 provided in opposite relation in the housing adjacent to the closed end thereof, all of which is well shown in FIGS. 2 and 3. The lever means 32 are then placed in the guide means 38 so that the pivotal end 36 of the lever 32 rests on the brush 16. At the opposite extremity from said end 36 of the lever means 32, there is provided a trunnion means 34 permitting pivotal movement thereof on a shelf portion 35 which is provided in said guide means 38.

A protuberance means 37 is provided adjacent to the pivot means 34 on the lever means 32 and is designed to receive the lower extremity of a compression spring member 40 with its contour being complemental to the walls provided in the housing and thereby arranged to retain the spring in a plane normal to the longitudinal extent of said lever means.

It is believed to be now clear from the foregoing that by manually retaining the two springs 40 within the guide means, and having previously secured the end plate in position, as explained earlier, an end cover 6 is slid over the closed end of the housing 2 to fully enclose the guide means in positive planar juxtaposition with the periphery of the housing 2. Whereupon a suitable tape-like seal means may be placed about the circumference of the joint between the end cover 6 and the housing 2.

FIG. 2 shows an isometric view of the plastic molded housing, following the invention, a portion of which is cut away in the area of the guide means 38 and 38' to show interior detail. The cutaway shows the general shape and longitudinal extent of the guide means 38, extending from the shelf portion at the rear toward the terminal means at the front. This figure well illustrates one of a pair of apertures 45 through which screws 8 are inserted to secure the end cover 6 to the housing 2. Also visible is one of a pair of apertures 47 through which screws 8 are inserted to secure end plate 4 to housing 2. The pair of terminals 42 by which power connections are made are also readily visible.

FIG. 3 shows in top plan the assembly of the lever means 32 in the guide means therefor and clearly illustrates the trunnions 34. This view also shows the lever means as well as the oppositely offstanding bosses 34 with the opposite extremity 36 of the lever means in engagement with and urging the brush toward the commutator. Adjacent to the bosses, there is formed an upstanding protuberance 37 designed to cooperate with the helically coiled spring 40 in order to retain said spring in a plane normal to the longitudinal extent of said lever means and consequently urge the brush toward the commutator.

The design of the lever means was particularly chosen such that the measured change in the spring length is of a substantially lower ratio than the decrease in the brush length due to wear, resulting in an insignificant change of force upon the brush. Further, this design allows a spring of higher rate to be installed in the housing avoiding the troublesome design of previous units known in the art which have very small rate "soft spring" designs that so often are the cause of brush "hang up". The combination of a cam, as has been described, and a spring of a chosen rate allows the application of a proper force in psi to be exerted on the brush. The choice of and the maintenance of the proper spring force as exerted on the brush is most important to the above indicated goal of a long brush life. Evidence exists by way of prototype tests that the long brush life desired has been achieved. In tests of three prototypes, the first unit tested had a brush life of over 2,200 hours, the second had a brush life substantially over 3,500 hours, while the third had a brush life in excess of 4,000 hours.

Since certain variations may be made in the preceding construction and different embodiments of the invention could be made without departing from the scope thereof, it is intended that all matter contained in the foregoing description and shown in the attached figures shall be interpreted as illustrative and not limiting.

It is also to be understood that the following claims are intended to cover all of the generic and specific features of the invention herein described and all statements as to the scope of the invention which, as a matter of language, might be said to fall therebetween.

What is claimed is:

1. In an electric motor having an armature and associated commutator and brushes, the combination comprising, a one-piece closed end housing serving to support one end of the bearing carrying shaft of the armature, end plate means adapted for association with the other end of said housing, said end plate means including further bearing means serving to support the other end of said armature shaft, plural longitudinally spaced oppositely disposed guide means integral with said housing, the first of said guide means serving to support the brushes and the second of said guide means serving to support pivotally mounted spring urged lever means having a longitudinal extent and spanning said plural guide means.

2. In an electric motor as claimed in claim 1, wherein the second guide means includes a shelf portion adapted to receive the pivotal lever means.

3. In an electric motor as claimed in claim 1, wherein the pivotal lever means include means cooperative with said spring for retaining the same in a plane normal to the longitudinal extent of said lever means.

4. In an electric motor as claimed in claim 1, wherein a shell portion encompasses the closed end of said housing.

5. In an electric motor as claimed in claim 4, wherein the shell portion includes an axial aperture.

6. In an electric motor as claimed in claim 4, wherein the shell portion retains the spring in engagement with the lever means.

7. In an electric motor as claimed in claim 4, wherein the shell portion includes a terminal flange portion, said terminal flange portion being arranged to be sealed to said housing.

8. In an electric motor as claimed in claim 1, wherein the longitudinal extent of said lever means lies in at least two distinct planes.

9. In an electric motor as claimed in claim 8, wherein the two distinct planes are parallel.

* * * * *